United States Patent
Kim et al.

(10) Patent No.: US 11,688,902 B2
(45) Date of Patent: Jun. 27, 2023

(54) SYSTEM FOR CONTROLLING BATTERY CELL TEMPERATURE AND METHOD FOR CONTROLLING SAME

(71) Applicant: KOREA INSTITUTE OF MACHINERY & MATERIALS, Daejeon (KR)

(72) Inventors: Jin Sub Kim, Seoul (KR); Jungho Lee, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 100 days.

(21) Appl. No.: 17/058,206

(22) PCT Filed: Jan. 24, 2019

(86) PCT No.: PCT/KR2019/001043
§ 371 (c)(1),
(2) Date: Nov. 24, 2020

(87) PCT Pub. No.: WO2019/231070
PCT Pub. Date: Dec. 5, 2019

(65) Prior Publication Data
US 2021/0159558 A1    May 27, 2021

(30) Foreign Application Priority Data
May 29, 2018    (KR) .................. 10-2018-0061218

(51) Int. Cl.
*H01M 10/6555* (2014.01)
*H01M 10/613* (2014.01)
(Continued)

(52) U.S. Cl.
CPC ....... *H01M 10/6555* (2015.04); *H01M 10/48* (2013.01); *H01M 10/486* (2013.01);
(Continued)

(58) Field of Classification Search
CPC ........... H01M 10/6555; H01M 10/613; H01M 10/615; H01M 10/63; H01M 10/6556; H01M 10/486
See application file for complete search history.

(56) References Cited

U.S. PATENT DOCUMENTS 5,756,227 A  *  5/1998  Suzuki ............... H01M 10/625
                                                     429/62
2016/0079637 A1    3/2016  Nemesh et al.

FOREIGN PATENT DOCUMENTS

CN          106992275 A  *  7/2017
KR    10-2011-0130277 A    12/2011
(Continued)

OTHER PUBLICATIONS

International Search Report dated May 10, 2019, corresponding to International Application No. PCT/KR2019/001043.
(Continued)

*Primary Examiner* — Jimmy Vo
(74) *Attorney, Agent, or Firm* — Hauptman Ham, LLP (57) ABSTRACT

In a system for controlling battery cell temperature and a method for controlling the system, the system includes a planar shape heat transferring unit, a cooling plate, a heating plate, a radiator, a heater and a controller. The planar shape heat transferring unit makes contact with a battery cell. The cooling plate is disposed at a first side of the battery cell to be heat-transferred with the planar shape heat transferring unit. The heating plate is disposed at a second side of the battery cell to be heat-transferred with the planar shape heat transferring unit. The radiator is connected to the cooling passage, to provide a cooled first fluid to the cooling passage. The heater is connected to the heating passage, to provide a heated second fluid to the heating passage. The controller is configured to provide the first fluid or the second fluid.

6 Claims, 6 Drawing Sheets

(51) Int. Cl.
    *H01M 10/615*     (2014.01)
    *H01M 10/63*     (2014.01)
    *H01M 10/6556*     (2014.01)
    *H01M 10/48*     (2006.01)

(52) U.S. Cl.
    CPC ....... *H01M 10/613* (2015.04); *H01M 10/615* (2015.04); *H01M 10/63* (2015.04); *H01M 10/6556* (2015.04)

(56) References Cited

FOREIGN PATENT DOCUMENTS

| | | | | |
|---|---|---|---|---|
| KR | 10-2014-0143854 A | 12/2014 | | |
| KR | 20140143854 A | * 12/2014 | .......... | H01M 50/249 |
| KR | 10-2015-0130696 A | 11/2015 | | |
| KR | 10-2016-0074230 A | 6/2016 | | |
| KR | 20160074230 A | * 6/2016 | | |
| KR | 10-1670020 B1 | 10/2016 | | |
| KR | 10-2017-0051817 A | 5/2017 | | |
| KR | 10-2017-0092982 A | 8/2017 | | |

OTHER PUBLICATIONS

Korean Notice of allowance dated Jun. 25, 2019, in connection with the Corresponding Korean Patent Application No. 10-2018-0061218.

* cited by examiner

SYSTEM FOR CONTROLLING BATTERY CELL TEMPERATURE AND METHOD FOR CONTROLLING SAME

CROSS-REFERENCE TO RELATED APPLICATION

This present application is a national stage filing under 35 U.S.C § 371 of PCT application number PCT/KR2019/001043 filed on Jan. 24, 2019 which is based upon and claims the benefit of priority to Korean Patent Application No. 10-2018-0061218 filed May 29, 2018 in the Korean Intellectual Property Office. The disclosures of the above-listed applications are hereby incorporated by reference herein in their entireties.

BACKGROUND

1. Field of Disclosure

The present disclosure of invention relates to a system for controlling battery cell temperature and a method for controlling the system, and more specifically the present disclosure of invention relates to a system for controlling battery cell temperature and a method for controlling the system, capable of selectively increasing or decreasing temperature of a battery.

2. Description of Related Technology

Recently, a rechargeable secondary battery cell is widely used for an energy source of a mobile device.

In addition, the secondary battery cell is used for a power source of an electric vehicle, a hybrid vehicle, and so on which is a substitute for a conventional vehicle using a fossil fuel.

The electric car is designed to be driven by a driving motor using an electric energy, and thus, relatively high voltage battery cell should be provided to increase the efficiency or the power of the electric car.

Accordingly, the battery cell having a relatively large size or large power is necessary for the electric car or relatively large-sized devices, and thus, a battery module in which a plurality of battery cells is electrically connected, or a middle or large sized battery pack having the battery module as a unit is normally used.

The above battery module or the battery pack needs to be manufactured with a relatively smaller size or weight, and thus a square shape battery or a pouch shape battery may be normally used as a unit battery of the battery module or the battery pack, since the square shape battery or the pouch shape battery is easily stacked with each other and has a relatively smaller weight.

For example, the pouch shape battery having an outer member like an aluminum laminate is widely used, since the weight and the manufacturing costs are is relatively less and the shape is easily changed.

The battery cell of the battery module generates massive heats in a charging or discharging process.

Thus, a passage in which a cooling material flows should be formed between the stacked battery cells or the battery modules, to dissipate the heat more efficiently.

Accordingly, in the conventional battery pack, the heat dissipation technology for dissipating the battery pack and for increasing or maintaining the life span or the capability of the battery pack has been developed.

However, the heat providing technology for heating the battery cell or the battery pack is relatively less developed, even though user's demands for technical specification of a cold start system or a chilling startup system used for the electric vehicle are complicated or increased.

Thus, in addition to the cooling of the battery cell, the heating of the battery cell for providing a sufficient power in the cold start is also necessary.

Related prior art is Korean Patent No. 10-1670020.

SUMMARY

The present invention is developed to solve the above-mentioned problems of the related arts. The present invention provides a system for controlling battery cell temperature and a method for controlling the system, capable of maintaining temperature of a battery cell with a predetermined temperature, by cooling and heating the battery cell, using a planar shape heat transferring unit heat-transferred with a cooling plate and a heating plate.

According to an example embodiment, the system includes a planar shape heat transferring unit, a cooling plate, a heating plate, a radiator, a heater and a controller. The planar shape heat transferring unit makes contact with a battery cell. The cooling plate is disposed at a first side of the battery cell to be heat-transferred with the planar shape heat transferring unit. A cooling passage through which a cooling fluid passes is formed inside of the cooling pate. The heating plate is disposed at a second side of the battery cell to be heat-transferred with the planar shape heat transferring unit. A heating passage through which a heating fluid passes is formed inside of the heating pate. The radiator is connected to the cooling passage, to provide a cooled first fluid to the cooling passage. The heater is connected to the heating passage, to provide a heated second fluid to the heating passage. The controller is configured to provide the first fluid or the second fluid via comparing a measured temperature of the battery cell with a predetermined temperature of the battery cell.

In an example, the controller may be configured to select a first mode in which the first fluid is provided to the cooling passage, when the measured temperature is higher than the predetermined temperature, and a second mode in which the second fluid is provided to the heating passage, when the measured temperature is lower than the predetermined temperature.

In an example, the system may further include a moving unit, a first side of the moving unit being connected to the cooling plate, a second side of the moving unit being connected to the heating plate. The moving unit may move at least one of the cooling plate and the heating plate, to selectively make contact with the planar shape heat transferring unit.

In an example, the system may further includes a first direction control valve disposed in a passage through which a third fluid is drained, to move the third fluid to the radiator or the heater, and a second direction control valve disposed in a passage through which the first fluid and the second fluid pass, to move the first fluid to the cooling passage, or to move the second fluid to the heating passage.

In an example, the controller may control the first direction control valve to move the third fluid to the radiator, control the second direction control valve to move the first fluid to the cooling passage, and turn the heater off, in the first mode. The controller may control the first direction control valve to move the third fluid to the heater, and control the second direction control valve to move the second fluid to the heating passage, in the second mode.

In an example, the controller may control the moving unit for the cooling plate to make contact with the planar shape heat transferring unit and for the heating plate to be detached from the planar shape heat transferring unit, in the first mode. The controller may control the moving unit for the heating plate to make contact with the planar shape heat transferring unit and for the cooking plate to be detached from the planar shape heat transferring unit, in the second mode.

In an example, the planar shape heat transferring unit may be a thermal ground plane (TGP), and the TGP may include an inner space in which an operating fluid is received, and a porous coating layer disposed at a side of the inner space to accelerate a boiling of the operating fluid.

In an example, the battery cell may be a plural, and the planar shape heat transferring unit may be disposed between the battery cells adjacent to each other.

In an example, the planar shape heat transferring unit may be disposed to enclose the battery cell.

According to another example embodiment, a method for controlling the system includes measuring a temperature of the battery cell, and providing the first fluid or the second fluid, via comparing the measured temperature of the battery cell with the predetermined temperature of the battery cell.

In an example, in providing the first fluid or the second fluid, the first mode in which the first fluid may be provided to the cooling passage is selected, when the measured temperature is higher than the predetermined temperature. The second mode in which the second fluid may be provided to the heating passage is selected, when the measured temperature is lower than the predetermined temperature.

In an example, after the first mode or the second mode selected, the controller may operate the moving unit, to move at least one of the cooling plate and the heating plate.

According to the present example embodiments, the battery cell is cooled or heated by the planar shape heat transferring unit which may be heat-transferred with the cooling plate and the heating plate, and thus the temperature of the battery cell may be maintained to be the predetermined temperature with a relatively simple structure.

In addition, the porous coating layer is formed in the inner space of the planar shape heat transferring unit, and thus the heat transfer may be performed in a whole area of the planar shape heat transferring unit. Thus, the battery cell may be uniformly cooled and heated in a whole area thereof.

In addition, the heat transfer may be performed with moving the cooling plate and the heating plate using the moving unit, and thus the temperature of the battery cell may be controlled more efficiently.

| * Reference numerals | |
|---|---|
| 10: planar shape heat transferring unit | 11: inner space |
| 12: porous coating layer | 20: cooling plate |
| 21: cooling passage | 30: heating plate |
| 31: cooling passage | 40: radiator |
| 50: heater | 61: first direction control valve |
| 62: second direction control valve | 63: first valve |
| 64: second valve | 71: first inlet |
| 72: first outlet | 73: second inlet |
| 74: second outlet | 75: first circulation |
| 76: second circulation | 80: moving unit |
| 81: rack | 82: pinion |
| 83: motor | |
| L: operating fluid | LM: operating fluid liquid layer |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. The invention is described more fully hereinafter with reference to the accompanying drawings, in which embodiments of the invention are shown.

Figure 1:
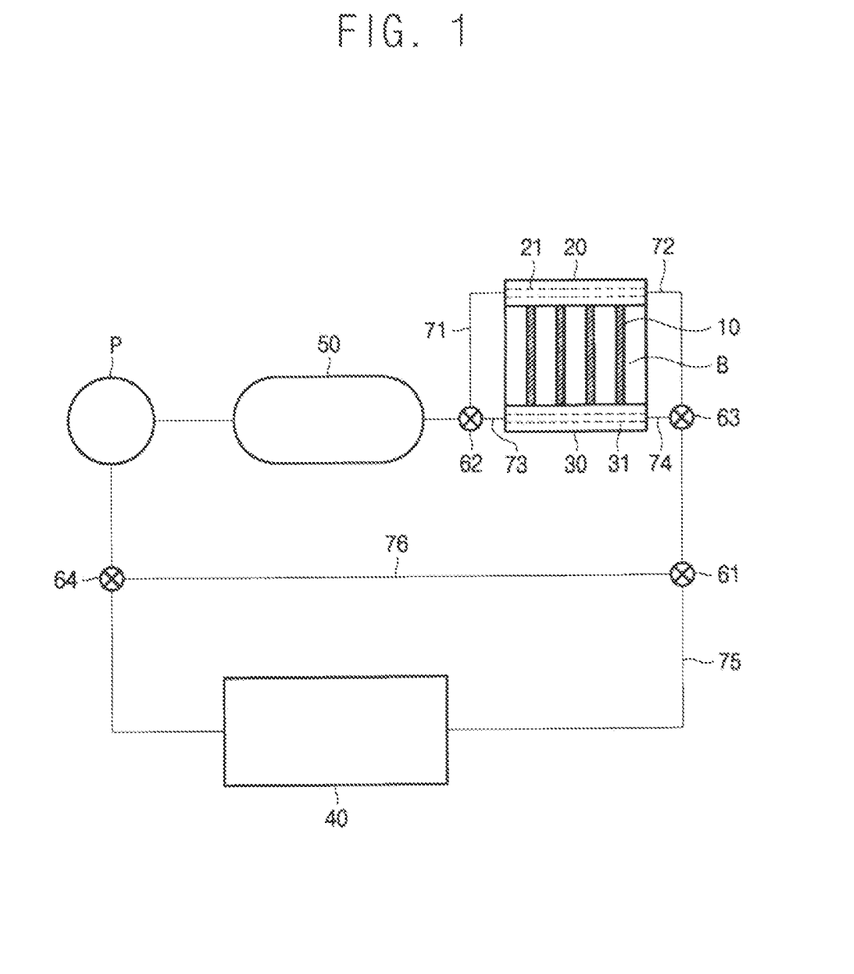
FIG. 1 is a schematic view illustrating a system for controlling battery cell temperature according to an example embodiment of the present invention.
Figure 2:
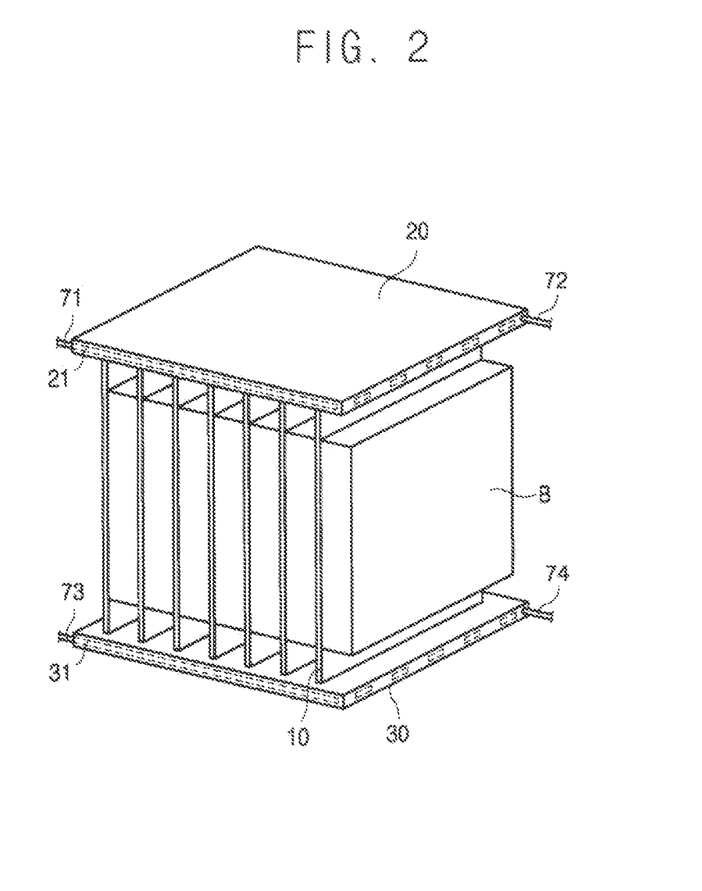
FIG. 2 is a perspective view partially illustrating the system for controlling battery cell temperature of FIG. 1.

FIG. 1 is a schematic view illustrating a system for controlling battery cell temperature according to an example embodiment of the present invention. FIG. 2 is a perspective view partially illustrating the system for controlling battery cell temperature of FIG. 1.

Referring to FIGS. 1 and 2, the system for controlling battery cell temperature (hereinafter, the system) includes a planar shape heat transferring unit 10, a cooling plate 20, a heating plate 30, a radiator 40, a heater 50 and a controller (not shown).

The planar shape heat transferring unit 10 is disposed to make contact with a battery cell B.

Here, the battery cell B may be a plural, and the planar shape heat transferring unit 10 may be disposed between the battery cells adjacent to each other.

The planar shape heat transferring unit 10 is explained below referring to FIG. 3.

Figure 3:
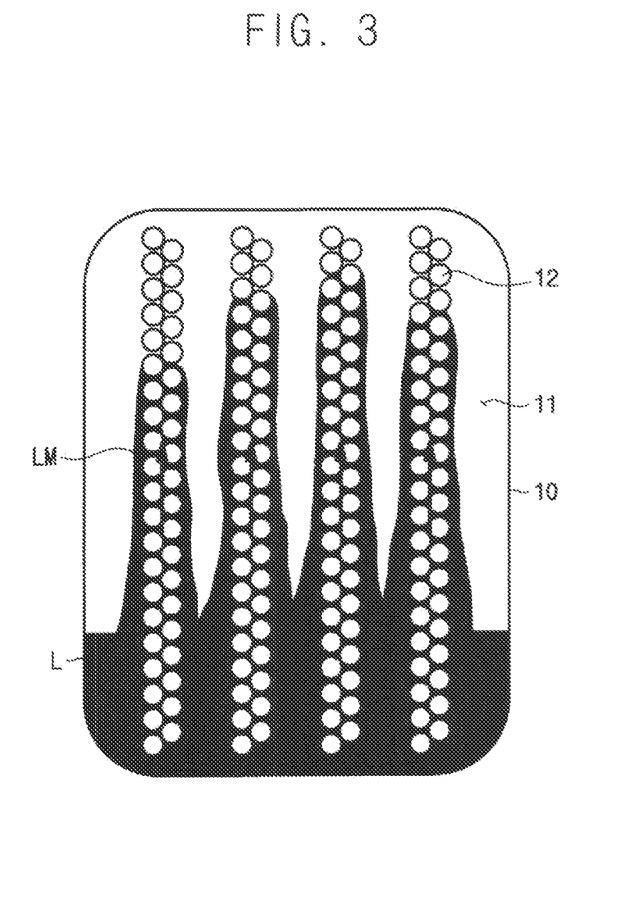
FIG. 3 is a side view illustrating a porous coating layer, in the system of FIG. 1.

FIG. 3 is a side view illustrating a porous coating layer, in the system of FIG. 1.

The planar shape heat transferring unit 10 may be a thermal ground plane (TGP), and thus the planar shape heat transferring unit 10 is explained below as the TGP.

An operating fluid L is received in an inner space 11 of the TGP, and a porous coating layer 12 is formed at a side surface of the inner space 11. The porous coating layer 12 may accelerate a boiling of the operating fluid L.

As illustrated in FIG. 3, a plurality of the porous coating layers 12 is disposed or arranged along a longitudinal direction of the battery cell B at the side surface of the battery cell B.

Here, the operating fluid L is disposed at a lower portion of the inner space 11, and the operating fluid L moves toward the porous coating layer 12 by the capillary action, to form an operating fluid liquid layer LM on the porous coating layer 12.

When the heat is generated from the battery cell B, the heat from the battery cell B heats the operating fluid liquid layer LM making contact with the porous coating layer 12.

Here, the contact area between the porous coating layer 12 and the operating fluid L increases due to the porosities of the porous coating layer 12, and thus the operating fluid L may be boiled within a relatively shorter period.

As the operating fluid L boils, a vapor is generated, and then the vapor moves from the porous coating layer 12 toward an inner surface of the inner space 11, which means the vapor moves toward the cooling plate 20 explained below. Thus, the vapor is heat-transferred with a first fluid explained below, and then the vapor is condensed.

The condensed operating fluid L is dropped downwardly in the inner space 11 due to the gravity, or moves toward the porous coating layer 12, and then the condensed operating fluid L forms the operating fluid liquid layer LM on the porous coating layer 12. Thus, the operating fluid L is circulated inside of the inner space 11.

Accordingly, the heat from the battery cell B may be dissipated outwardly, by the heat transfer due to a phase change of the operating fluid L The cooling plate 20 is disposed at a first side of the battery cell B, and is heat-transferred with the TGP 10. For example, the cooling plate 20 may be disposed at an upper side of the battery cell 20.

When the measured temperature of the battery cell B is higher than a predetermined temperature of the battery cell B, the cooling plate 20 cools the temperature of the battery cell B to be the predetermined temperature.

The temperature of the battery cell B may be measured by a temperature sensor (not shown) connected to the battery cell B.

A cooling passage 21 through which a first fluid flows is formed inside of the cooling plate 20. The radiator 40 is connected to the cooling passage 21, and thus the first fluid cooled by the radiator 40 is provided to the cooling passage 21.

As the first fluid is provided to the cooling passage 21, the first fluid flowing through the cooling passage 21 is heat-transferred with the operating fluid L received by the inner space 11 of the TGP 10, and thus the heat generated from the battery cell B is dissipated outwardly. Then, the temperature of the battery cell B is decreased.

The heating plate 30 is disposed at a second side of the battery cell B, and is heat-transferred with the TGP 10. For example, the heating plate 30 may be disposed at a lower side of the battery cell 20.

When the measured temperature of the battery cell B is lower than the predetermined temperature of the battery cell B, the heating plate 30 heats the temperature of the battery cell B to be the predetermined temperature.

A heating passage 31 through which a second fluid flows is formed inside of the heating plate 30. The heater 50 is connected to the heating passage 31, and thus the second fluid heated by the heater 50 is provided to the heating passage 31.

As the second fluid is provided to the heating passage 31, the second fluid flowing through the heating passage 31 is heat-transferred with the operating fluid L received by the inner space 11 of the TGP 10, and thus the temperature of the operating fluid L is increased and the heat of the operating fluid L is transferred to the battery cell B. Then, the temperature of the battery cell B is increased.

The radiator 40 is connected to an inlet of the cooling passage 21, and provides the cooled first fluid toward the cooling passage 21.

The radiator 40 is connected to an outlet of each of the cooling passage 21 and the heating passage 31, and thus a third fluid heat-transferred at the cooling passage 21 or the heating passage 31 passes through the radiator 40. Then, the third fluid may be cooled to be the first fluid.

The heater 50 is connected to an inlet of the heating passage 31, and provides the heated second fluid toward the heating passage 31.

The heater 50 is connected to an outlet of each of the cooling passage 21 and the heating passage 31, and thus the third fluid heat-transferred at the cooling passage 21 or the heating passage 31 passes through the heater 50. Then, the third fluid may be heated to be the second fluid.

The system according to the present example embodiment may further include a first direction control valve 61 and a second direction control valve 62.

The first direction control valve 61 is disposed at a passage through which the third fluid heat-transferred at the cooling passage 21 or the heating passage 31 is drained, and controls a moving direction of the third fluid, so that the third fluid may be moved to the radiator 40 or the heater 50.

The second direction control valve 62 is disposed at a passage through which the first fluid and the second fluid pass, controls a moving direction of the first fluid to move to the cooling passage 21 and controls a moving direction of the second fluid to move to the heating passage 31.

Hereinafter, referring to FIG. 1 again, dispositions and arrangements of the passages and valves configured in the system according to the present example embodiment.

A first inlet 71 is formed at a first end of the cooling passage 21, and the first inlet 71 is connected to the inlet of the cooling passage 21. A first outlet 72 is formed at a second end of the cooling passage 21, and the first outlet 72 is connected to the outlet of the cooling passage 21.

A second inlet 73 is formed at a first end of the heating passage 31, and the second inlet 73 is connected to the inlet of the heating passage 31. The second outlet 74 is formed at a second end of the heating passage 31, and the second outlet 74 is connected to the outlet of the heating passage 31.

In addition, a first circulation 75 is formed. A first end of the first circulation 75 is connected to the first outlet 72 and the second outlet 74, and a second end of the first circulation 75 is connected to the first inlet 71 and the second inlet 73. Here, the first circulation 75 is connected through the radiator 40 and the heater 50.

A first valve 63 is connected among the first outlet 72, the second outlet 74 and the first circulation 75.

The first valve 63 controls the third fluid passing through the first outlet 72 to move to the first circulation 75, or controls the third fluid passing through the second outlet 74 to move to the first circulation 75. The first valve 63 may be a check valve controlling the fluid to move in one direction.

A second circulation 76 is formed. A first end of the second circulation 76 is deviated from the first circulation 75 between the first valve 63 and the radiator 40, and a second end of the second circulation 76 is deviated from the first circulation 75 between the radiator 40 and the heater 50.

The third fluid flowing in the second circulation 76 does not pass through the radiator 40.

As explained above, the first direction control valve 61 is connected between the first circulation 75 and a first end of the second circulation 76, and the second valve 64 is connected between the first circulation 75 and a second end of the second circulation 76.

Thus, the first direction control valve 61 controls the moving direction of the third fluid flowing in the first circulation 75 to move toward the radiator 40, or to move toward the second circulation 76 instead of moving toward the radiator 40.

In addition, the second valve 64 controls the first fluid cooled by the radiator 40 to move to the first circulation 75, or controls the third fluid flowing in the second circulation 76 to move to the first circulation 75. The second valve 64 may be a check valve like the first valve 63, to control the fluid to move in one direction.

The second direction control valve 62 is connected among the first circulation 75, the first inlet 71 and the second inlet 73.

The second direction control valve 62 controls a moving direction of the first fluid flowing in the first circulation 75 to move to the first inlet 71, or controls a moving direction of the second fluid flowing in the first circulation 75 to move to the second inlet 73.

The heater 50 is connected in the first circulation 75, and is disposed at a side of the second direction control valve 62.

Here, a pump P may be connected at a first end of the heater 50, and the pump P pumps the fluid to be circulated in the passage.

The controller selects one of a first mode and a second mode. In the first mode, the first fluid is provided to the cooling plate 20, and in the second mode, the second fluid is provided to the heating plate 30.

For example, the controller compares the measured temperature of the battery cell B to the predetermined temperature of the battery cell B. Then, when the measured temperature is higher than the predetermined temperature, the first mode is selected so as to provide the first fluid to the cooling passage 21. When the measured temperature is lower than the predetermined temperature, the second mode is selected so as to provide the second fluid to the heating passage 31.

Hereinafter, the temperature control of the battery cell is explained, in the first mode and in the second mode.

The first mode is selected or performed, when the measured temperature of the battery cell B is higher than the predetermined temperature of the battery cell B.

Here, the controller controls the first direction control valve 61 for the third fluid to move to the radiator 40, and controls the second direction control valve 62 for the first fluid to move to the cooling passage 21.

In addition, the controller controls the heater 50 to be turned off, and thus the first fluid is not heated in passing through the heater 50.

Then, the third fluid drained to the first outlet 72 from the cooling passage 21, passes through the first valve 63 to move to the first circulation 75 with passing through the radiator 40.

Here, the third fluid is cooled in passing through the radiator 40, to be changed into the first fluid.

The first fluid continuously moves to the first circulation 75, with passing through the heater 50.

Here, even though the first fluid passes through the heater 50, the temperature of the first fluid is maintained since the heater 50 is in an off-state.

The moving direction of the first fluid is controlled by the second direction control valve 62, and thus the first fluid is flowed into the cooling passage 21 through the first inlet 71.

Here, the cooling plate 20 is heat-transferred with the TGP 10, to dissipate the heat of the batter y cell B for decreasing the temperature of the battery cell B.

The heat-transfer between the cooling plate 20 and the TGP 10 is explained below.

In the inner space 11 of the TGP 10, the operating fluid L is moves to the porous coating layer 12 due to the capillary action, and the operating fluid liquid layer LM is formed.

Here, the heat from the battery cell B heats the operating fluid liquid layer LM formed on the porous coating layer 12.

Thus, the operating fluid liquid layer LM is changed into the vapor, and the vapor rises in the inner space 11 to move to an inner side of the inner space 11 heading for the cooling plate 20.

Here, the vapor moved to the inner side of the inner space 11 is heat-transferred with the first fluid, to dissipate the heat of the battery cell B outwardly.

The vapor heat-transferred with the first fluid is condensed, to be dropped downwardly in the inner space 11, or to be moved to the porous coating layer 12.

Accordingly, the heat from the battery cell B is dissipated, to decrease the temperature of the battery cell B.

The second mode is selected or performed, when the measured temperature of the battery cell B is lower than the predetermined temperature of the battery cell B.

Here, the controller controls the first direction control valve 61, to move the third fluid to move to the heater 50 without passing through the radiator 40, and to control the second direction control valve 62 to move the third fluid to the heating passage 31.

In addition, the controller controls the heater 50 to be turned on, so that the third fluid is heated by the heater 50 when passing through the heater 50.

Then, the third fluid drained to the second outlet 74 from the heating passage 31, passes through the first valve 63 and flows in the first circulation 75, and then move to the second circulation 76 by the first direction control valve 61.

The third fluid moved to the second circulation 76, is moved to the first circulation 75 again, to pass through the heater 50.

Here, the third fluid is heated by the heater 50 when passing through the heater 50, to be changed into the second fluid.

The moving direction of the second fluid is controlled by the second direction control valve 62, to be flowed into the heating passage 31 through the second inlet 73.

Here, the heating plate 30 is heat-transferred with the TGP 10, to heat the battery cell B for increasing the temperature of the battery cell B.

Hereinafter, the heat-transfer between the heating plate 30 and the TGP 10 is explained below.

The second fluid moved to the heating passage 31 of the heating plate 30, is heat-transferred with the operating fluid L.

The operating fluid L heat-transferred with the second fluid, is changed into the vapor, and is moved upwardly in the inner space 11. Then, the vapor is moved into the porous coating layer 12 making contact with the battery cell B.

The heat of the vapor moved into the porous coating layer 12 is transferred to the battery cell B, to heat the battery cell B. Here, with the heat of vapor being transferred to the battery cell B, the vapor is condensed and then is dropped downwardly in the inner space 11 or moves to a lower portion of the inner space 11 through the porous coating layer 12.

Accordingly, the battery cell B is heated, to increase the temperature of the battery cell B.

Hereinafter, referring to FIGS. 4 and 5, a moving unit 80 of the system of FIG. 1 is explained.

Figure 4:
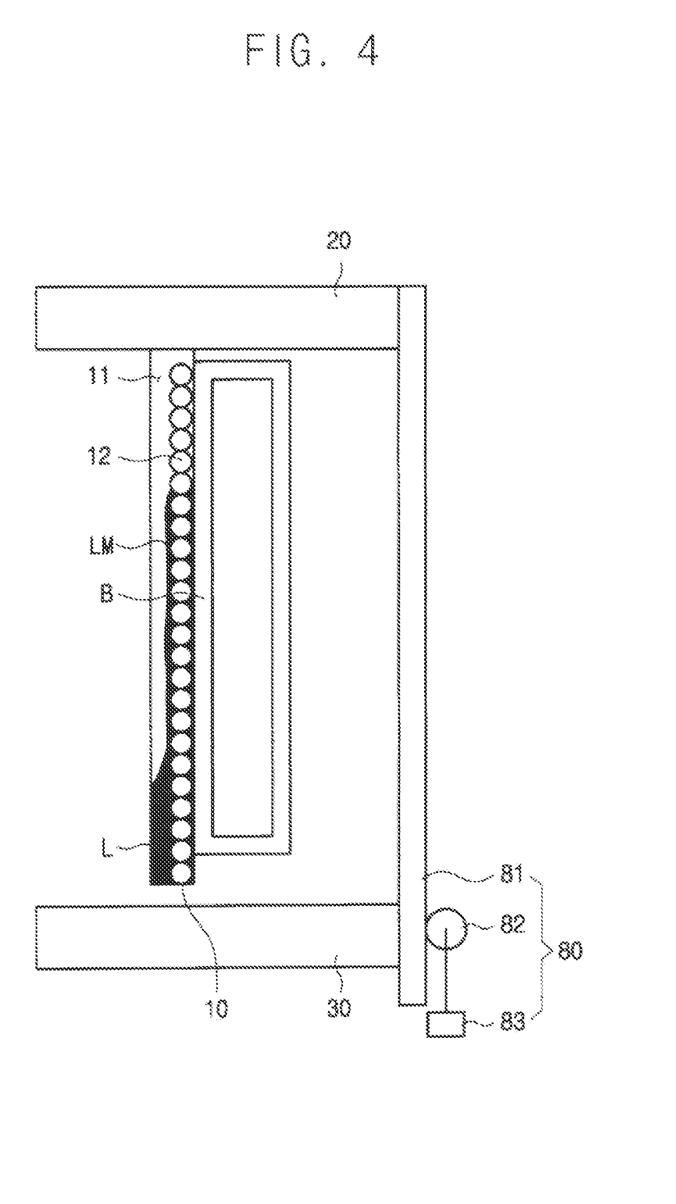
FIG. 4 is a schematic view illustrating an operation state of a moving unit in a first mode, in the system of FIG. 1.

FIG. 4 is a schematic view illustrating an operation state of a moving unit in a first mode, in the system of FIG. 1. FIG. 5 is a schematic view illustrating an operation state of a moving unit in a second mode, in the system of FIG. 1.

Figure 5:
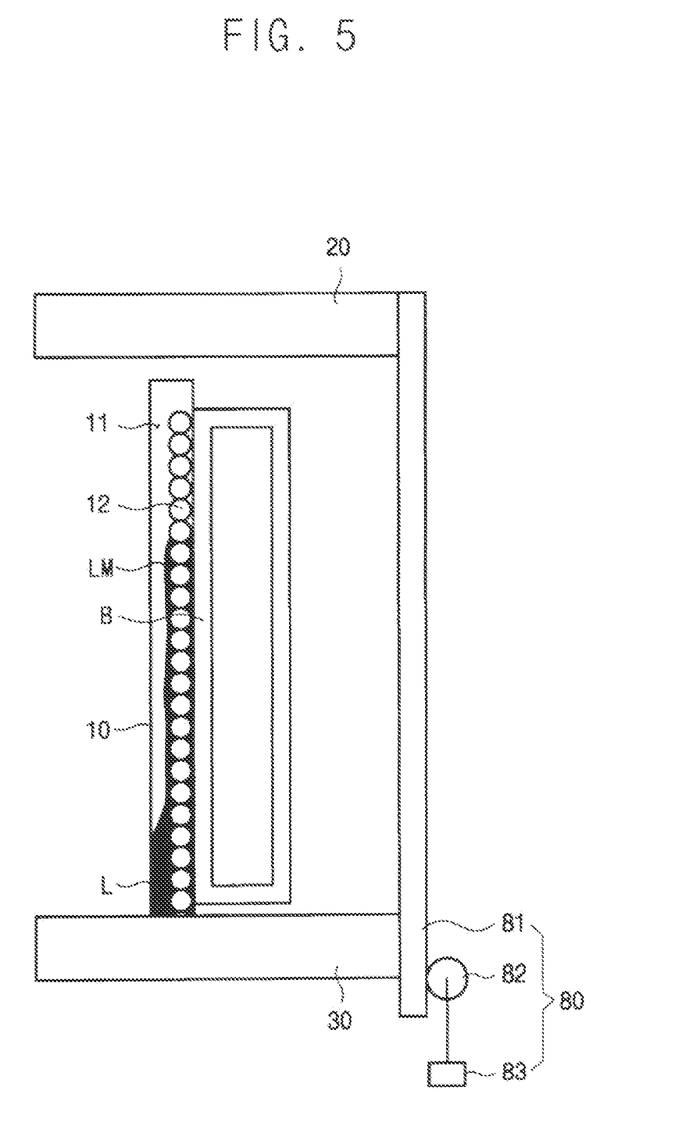
FIG. 5 is a schematic view illustrating an operation state of a moving unit in a second mode, in the system of FIG. 1.

Referring to FIGS. 4 and 5, the system according to the present example embodiment may further include the moving unit 80. The moving unit 80 selectively makes the cooling plate 20 or the heating plate 30 to contact with the planar shape heat transferring unit 10.

A first side of the moving unit 80 is connected to the cooling plate 20, and a second side of the moving unit 80 is connected to the heating plate 30, and thus the moving unit 80 moves one of the cooling plate 20 and the heating plate 30.

The moving unit 80 moves one of the cooling plate 20 and the heating plate 30, to selectively make the cooling plate 20 or the heating plate 30 to contact with the planar shape heat transferring unit 10.

The moving unit 80 may move both of the cooling plate 20 and heating plate 30.

For example, the moving unit 80 may include a structure or a combination of rack 81 and pinion 82, but may not be limited thereto.

A first end of the rack 81 is connected to the first side of the cooling plate 20, and a second end of the rack 81 is connected to the first side of the heating plate 30. The pinion 82 may be connected with the rack 81 by gear combination.

The moving unit 80 may further include a motor 83 which is connected to the pinion 82 and rotates the pinion 82.

For example, the motor 83 is driven to rotate the pinion 82, and then the rack 81 moves linearly to move the cooling plate 20 and the heating plate 30.

The controller controls the moving unit 80, as the selection of the first mode or the second mode.

For example, when the first mode is selected, as illustrated in FIG. 4, the controller controls the moving unit 80, so as to make the cooling plate 20 to contact with the planar shape heat transferring unit 10, and to make to heating plate 30 to be detached from the planar shape heat transferring unit 10.

As the heating plate 30 is detached from the planar shape heat transferring unit 10 in the first mode, the heat transfer is focused or is only performed between the cooling plate 20 and the planar shape heat transferring unit 10, and thus the temperature control for cooling the battery cell B may be enhanced more efficiently.

In addition, when the second mode is selected, as illustrated in FIG. 5, the controller controls the moving unit 80, so as to make the heating plate 30 to contact with the planar shape heat transferring unit 10, and to make to cooling plate 20 to be detached from the planar shape heat transferring unit 10.

As the cooling plate 20 is detached from the planar shape heat transferring unit 10 in the second mode, the heat transfer is focused or is only performed between the heating plate 30 and the planar shape heat transferring unit 10, and thus the temperature control for heating the battery cell B may be enhanced more efficiently.

Hereinafter, referring to FIG. 6, a system for controlling battery cell temperature according to another example embodiment of the present invention is explained.

Figure 6:
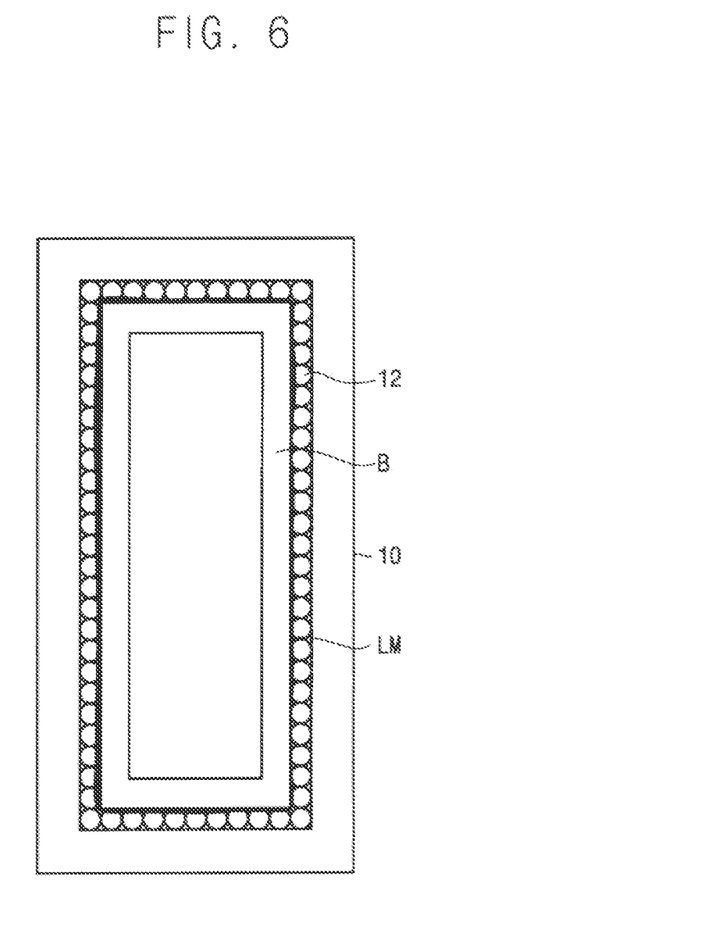
FIG. 6 is a schematic view illustrating a system for controlling battery cell temperature according to another example embodiment of the present invention.

FIG. 6 is a schematic view illustrating a system for controlling battery cell temperature according to another example embodiment of the present invention.

The system according to the present example embodiment is substantially same as the system explained referring to FIGS. 1 to 5, except for a disposition of the planar shape heat transferring unit, and thus same reference numerals are used for the same elements and any repetitive explanation will be omitted.

Referring to FIG. 6, in the present example embodiment, the planar shape heat transferring unit 10 is disposed to enclose the battery cell B.

Here, a plurality of the porous coating layers 12 is disposed around a circumference of an outer side of the battery cell B.

In the present example embodiment, the processes of the first mode and the second mode are substantially same as those explained referring to FIGS. 1 to 5, and thus repetitive explanation is omitted.

Hereinafter, the method for controlling the system is explained.

The method for controlling the system includes a temperature measuring step, a mode selecting step, and a moving unit operating step.

In the temperature measuring step, the temperature sensor measures the temperature of the battery cell B.

In the mode selecting step, the controller compares the measured temperature of the battery cell B in the temperature measuring step, to the predetermined temperature of the battery cell B. Then, when the measured temperature is higher than the predetermined temperature, the first mode in which the first fluid is provided to the cooling passage 21 is selected. Alternatively, when the measured temperature is lower than the predetermined temperature, the second mode in which the second fluid is provided to the cooling passage 31 is selected.

In the moving unit operating step, as the selection of the first mode or the second mode, the controller operates the moving unit 80 to move at least one of the cooling plate 20 and the heating plate 30.

Here, when the first mode is selected, the cooling plate 20 makes contact with the planar shape heat transferring unit 10 and the heating plate 30 is detached from the planar shape heat transferring unit 10, due to the moving unit 80.

In contrast, when the second mode is selected, the heating plate 30 makes contact with the planar shape heat transferring unit 10 and the cooling plate 20 is detached from the planar shape heat transferring unit 10, due to the moving unit 80.

According to the present example embodiments, the battery cell is cooled or heated by the planar shape heat transferring unit which may be heat-transferred with the cooling plate and the heating plate, and thus the temperature of the battery cell may be maintained to be the predetermined temperature with a relatively simple structure.

In addition, the porous coating layer is formed in the inner space of the planar shape heat transferring unit, and thus the heat transfer may be performed in a whole area of the planar shape heat transferring unit. Thus, the battery cell may be uniformly cooled and heated in a whole area thereof.

In addition, the heat transfer may be performed with moving the cooling plate and the heating plate using the moving unit, and thus the temperature of the battery cell may be controlled more efficiently.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A system for controlling battery cell temperature, the system comprising:
    a planar shape heat transferring unit contacted with a battery cell;
    a cooling plate disposed at a first side of the battery cell to be heat-transferred with the planar shape heat transferring unit and having a cooling passage formed inside of the cooling plate;
    a heating plate disposed at a second side of the battery cell to be heated with the planar shape heat transferring unit and having a heating passage formed inside of the heating plate;
    a radiator connected to the cooling passage and configured to provide a cooled first fluid to the cooling passage;
    a heater connected to the heating passage and configured to provide a heated second fluid to the heating passage;
    a moving unit having a first side connected to the cooling plate and a second side connected to the heating plate and configured to move both of the cooling plate and the heating plate at the same time; and
    a controller configured to provide the cooled first fluid or the heated second fluid by comparing a measured temperature of the battery cell with a predetermined temperature of the battery cell,
    wherein the controller is configured to select:
        a first mode in which the cooled first fluid is provided to the cooling passage, when the measured temperature is higher than the predetermined temperature; and
        a second mode in which the heated second fluid is provided to the heating passage, when the measured temperature is lower than the predetermined temperature, and
    wherein the moving unit is configured to move:
        when the first mode is selected, the cooling plate to contact with the planar shape heat transferring unit and the heating plate not to contact with the planar shape heat transferring unit, and
        when the second mode is selected, the heating plate to contact with the planar shape heat transferring unit and the cooling plate not to contact with the planar shape heat transferring unit.

2. The system of claim 1, further comprising:
    a first direction control valve disposed in a passage through which a third fluid is drained, to move the third fluid to the radiator or the heater; and
    a second direction control valve disposed in a passage through which the first fluid and the second fluid pass, to move the first fluid to the cooling passage, or to move the second fluid to the heating passage.

3. The system of claim 2,
    wherein, when the first mode is selected, the controller is configured to control
        the first direction control valve to move the third fluid to the radiator,
        the second direction control valve to move the first fluid to the cooling passage, and
        turn the heater off, and
    wherein, when the second mode is selected, the controller is configured to control
        the first direction control valve to move the third fluid to the heater, and
        the second direction control valve to move the second fluid to the heating passage.

4. A system for controlling battery cell temperature, the system comprising:
    a planar shape heat transferring unit contacted with a battery cell;
    a cooling plate disposed at a first side of the battery cell to be heat-transferred with the planar shape heat transferring unit and having a cooling passage formed inside of the cooling plate;
    a heating plate disposed at a second side of the battery cell to be heated with the planar shape heat transferring unit and having a heating passage formed inside of the heating plate;
    a radiator connected to the cooling passage and configured to provide a cooled first fluid to the cooling passage;
    a heater connected to the heating passage and configured to provide a heated second fluid to the heating passage; and
    a controller configured to provide the cooled first fluid or the heated second fluid by comparing a measured temperature of the battery cell with a predetermined temperature of the battery cell,
    wherein the planar shape heat transferring unit is a thermal ground plane (TGP), and
    wherein the TGP comprises an inner space in which an operating fluid is received, and a porous coating layer disposed at a side of the inner space to accelerate a boiling of the operating fluid.

5. The system of claim 4, further comprising:
    an additional battery cell adjacent to the battery cell,
    wherein the planar shape heat transferring unit is disposed between the battery cell and the additional cell.

6. The system of claim 4, wherein the planar shape heat transferring unit is disposed to enclose the battery cell.

* * * * *